(12) United States Patent
Kempanna (10) Patent No.: US 9,189,793 B2
(45) Date of Patent: Nov. 17, 2015

(54) SYSTEM AND METHOD OF CREATING AND DISPLAYING MESSAGES

(75) Inventor: Raghunandan Kempanna, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 1341 days.

(21) Appl. No.: 11/908,498

(22) PCT Filed: Apr. 15, 2005

(86) PCT No.: PCT/IN2005/000114
§ 371 (c)(1),
(2), (4) Date: Sep. 13, 2007

(87) PCT Pub. No.: WO2006/109320
PCT Pub. Date: Oct. 19, 2006

(65) Prior Publication Data
US 2008/0282155 A1    Nov. 13, 2008

(51) Int. Cl.
*G06F 17/00* (2006.01)
*G06Q 30/02* (2012.01)
*G06F 17/30* (2006.01)

(52) U.S. Cl.
CPC .......... *G06Q 30/02* (2013.01); *G06F 17/30867* (2013.01)

(58) Field of Classification Search
CPC ............ G06F 17/30867; G06F 17/212; G06Q 30/0241
USPC ................................. 715/273, 255, 248, 277
See application file for complete search history.

(56) References Cited

U.S. PATENT DOCUMENTS

| | | | |
|---|---|---|---|
| 5,647,002 A * | 7/1997 | Brunson | 709/206 |
| 5,946,646 A | 8/1999 | Schena et al. | |
| 6,119,098 A | 9/2000 | Guyot et al. | |
| 6,317,761 B1 | 11/2001 | Landsman et al. | |
| 6,636,242 B2 * | 10/2003 | Bowman-Amuah | 715/764 |
| 6,782,392 B1 * | 8/2004 | Weinberger et al. | 1/1 |
| 7,200,853 B2 * | 4/2007 | Kawai | 725/34 |
| 7,237,011 B1 * | 6/2007 | St. Pierre | 709/207 |
| 7,281,201 B2 * | 10/2007 | Kumar et al. | 715/255 |
| 7,624,352 B2 * | 11/2009 | Colleran et al. | 715/764 |
| 8,041,633 B2 * | 10/2011 | Knowles et al. | 705/39 |
| 8,099,482 B2 * | 1/2012 | Clark et al. | 709/223 |

(Continued)

FOREIGN PATENT DOCUMENTS

EP    0877314 A1    11/1998
WO    0157769 A1    8/2001

OTHER PUBLICATIONS

Young, Robert L., "An Object-Oriented Framework for Interactive data Graphics", ACM, 1987, pp. 78-90.*

*Primary Examiner* — Laurie Ries
(74) *Attorney, Agent, or Firm* — Hewlett-Packard Patent Department (57) ABSTRACT

A system and method of creating a message and displaying the same are described. The system includes a message composer operable on a computer system for composing and generating a message file. The message file has a content portion for containing a message content and a header portion for containing a message attribute. The system also includes a display device having a memory for storing the message file and a message management module for retrieving and rendering the message content on a screen, wherein the stored message file is assigned at least one of a time stamp and a sequential number for establishing a queue.

20 Claims, 7 Drawing Sheets

(56) References Cited

U.S. PATENT DOCUMENTS

| | | | |
|---|---|---|---|
| 2002/0138582 A1* | 9/2002 | Chandra et al. | 709/206 |
| 2002/0141491 A1* | 10/2002 | Corts et al. | 375/216 |
| 2002/0161674 A1* | 10/2002 | Scheer | 705/28 |
| 2002/0188658 A1* | 12/2002 | Ohashi et al. | 709/201 |
| 2003/0046162 A1 | 3/2003 | Nestel | |
| 2003/0060240 A1* | 3/2003 | Graham et al. | 455/566 |
| 2003/0061607 A1* | 3/2003 | Hunter et al. | 725/32 |
| 2003/0078983 A1* | 4/2003 | Sullivan et al. | 709/207 |
| 2003/0163369 A1* | 8/2003 | Arr | 705/14 |
| 2004/0070496 A1 | 4/2004 | Kirschner et al. | |
| 2005/0149622 A1* | 7/2005 | Kirkland et al. | 709/207 |
| 2010/0094878 A1* | 4/2010 | Soroca et al. | 707/748 |

* cited by examiner

SYSTEM AND METHOD OF CREATING AND DISPLAYING MESSAGES

FIELD OF INVENTION

This invention relates to systems and methods of creating and displaying advertisements or messages on an electronic device.

BACKGROUND OF INVENTION

Traditionally, advertisements and messages (such as announcements) are presented using posters, billboards, or notice boards. The proliferation of electronic display devices such as televisions, LCD displays and projectors means that the advertisements and messages can be more effectively and readily presented to the public as these electronic display devices are typically placed in a location of premises where it gives maximum viewing opportunity. However, currently, if a person desires to put up an advertisement or a message on one of these electronic display devices, prior arrangements have to be made with the display device operator or owner for the messages to be properly edited and formatted for display. Furthermore, current state of the display devices does not accommodate on the spot access to the display devices to upload the advertisement or message contents for displaying.

Accordingly, it is desirous to provide a system and method that allow the public or a patron at the premises to access the display devices and upload message content for displaying.

SUMMARY OF INVENTION

A system and method of creating a message and displaying the same are described. The system includes a message composer operable on a computer system for composing and generating a message file. The message file has a content portion for containing a message content and a header portion for containing a message attribute. The system also includes a display device having a memory for storing the message file and a message management module for retrieving and rendering the message content on a screen, wherein the stored message file is assigned at least one of a time stamp and a sequential number for establishing a queue.

BRIEF DESCRIPTION OF DRAWINGS

Embodiments of the invention are herein described, purely by way of example, with reference to the accompanying drawings, in which.

DETAILED DESCRIPTION OF INVENTION

A system and method of displaying advertisements or messages in an electronic display device are hereinafter described with reference to the drawings. The system and method enable a person to compose an advertisement, announcement, and so on, hereinafter referred generally to as a message, and upload the message to an electronic display device for displaying thereon. The electronic display device can be a television, LCD display controlled by a computer, a projector, and the like displaying devices (hereinafter generally referred to as "display device"). In the case of a projector, the screen of the display device refers to the projection of the projector on a surface.

Figure 1:
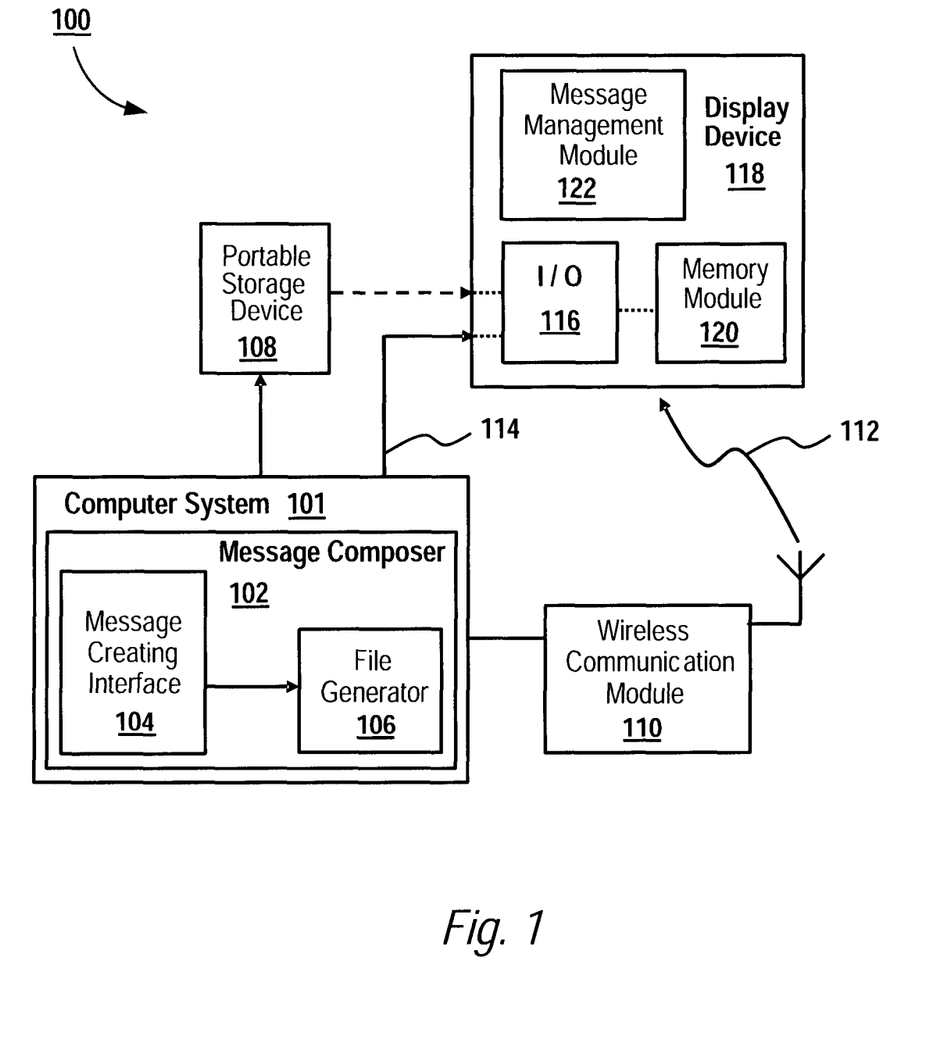
FIG. 1 shows a system for composing and displaying a message on a display device according to an embodiment of the present invention.

In an embodiment, a system 100 for enabling a user to compose messages and for uploading the messages to a display device for displaying thereon is shown in FIG. 1. The system 100 includes a message composer 102, a portable storage device 108 and a display device 118. The portable storage device 108 can be a portable hard disk, floppy diskette, optical storage devices (e.g. compact disk (CD), digital video disk (DVD)), and solid state memory devices such as a Memory Stick™, Multi-Media Card™ (MMC), Secure Digital™ (SD) card, Compact Flash™ (CF) card, and the like memory cards. The message composer 102 is a software module operable on a computer system 101 such as a conventional personal computer or personal digital assistant (PDA). The message composer 102 has a message creating interface 104 for interacting with a user for receiving message content and message attributes, and a file generator 106 for converting the message content into a file format recognizable by the display device 118.

The file generator 106 provides a message file for use by the display device 118. The message file has a content portion and a header portion. The content portion contains the message content, namely, the textual message, images, sound bites, video clips, or combinations thereof. The header portion contains information relating to the message attributes such as image format, textual message, color of the display message, modes of display (e.g. flashing and/or scrolling), duration of message display, priority of the message display, when to display the message (scheduling), and the location the message to be displayed on the screen of the display device 118.

The message file can be stored in the portable storage device 108 for uploading to the display device 118 when needed. The message file can also be transferred directly to the display device 118 using a wired connection 114 or wireless connection 112 via a wireless communication module 110 coupled to the computer system 101. The wireless communication module 110 is a known transceiver for receiving and transmitting radio frequency signals using Bluetooth, WiFi, ultra-wide band and the like wireless communication protocols.

The display device 118 includes an input-output port 116, a memory module 120 and a message management module 122. The input-output port 116 provides electronic communication interface with other electronic devices including the computer system 110. In an embodiment, the input-output port 116 can include serial, parallel, universal serial bus (USB) and FireWire ports, and the like communication ports.

Thus, the computer system 101 can communicate with the display device 118 via the wired connection 115 using the input-output port 116. The input-output port 116 can also include memory card slots for accessing data memory cards. The display device 118 may be equipped with a module (not shown) for receiving and transmitting radio signals with the wireless communication module 110. The input-output port 116 further can include an infra-red port for providing an alternative wireless communication with the computer system 101.

Figure 2:
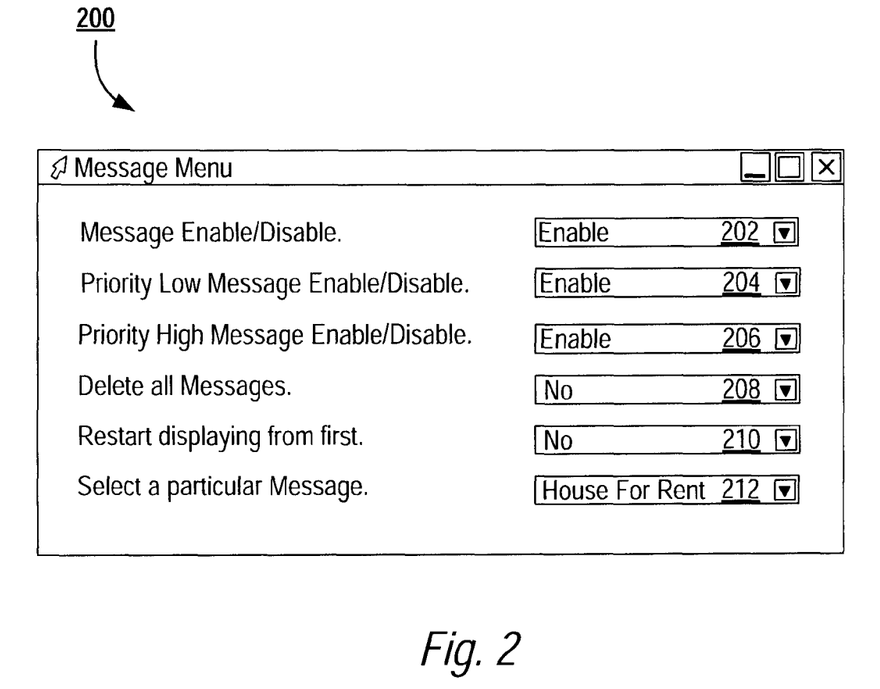
FIG. 2 shows an example of a message setting interface of a display device according to an embodiment of the present invention.

The message file received at the display device 118 is stored in the memory module 120. The message management module 122 accesses the memory module 120 to retrieve the specified message for displaying on the screen of the display device 118 according to the message attributes contained in the header of the message file. The message management module 122 can be a firmware or a software module embedded within and operable in the software system of the display device 118. Upon invoking, the message management module 122 provides a message setting interface 200 as shown in FIG. 2 on the screen of the display device 118.

The message setting interface 200 includes options for the user to select and to configure the way the messages stored in the memory module 120 should be displayed. These include an option to enable or disable message display 202, an option to enable or disable low priority messages 204, an option to enable or disable high priority messages 206, an option to remove messages 208 from the memory module 120, an option to restart displaying the messages from the start of the queue 210, and an option to select a particular message 212 for display. If the option to restart displaying the message from the start of the queue 210 is set to "Yes", the message management module 122 resumes displaying the messages starting from the first message in the queue. The effects of choosing the low and high priority options (204, 206) are described in further detail below.

Figure 3:
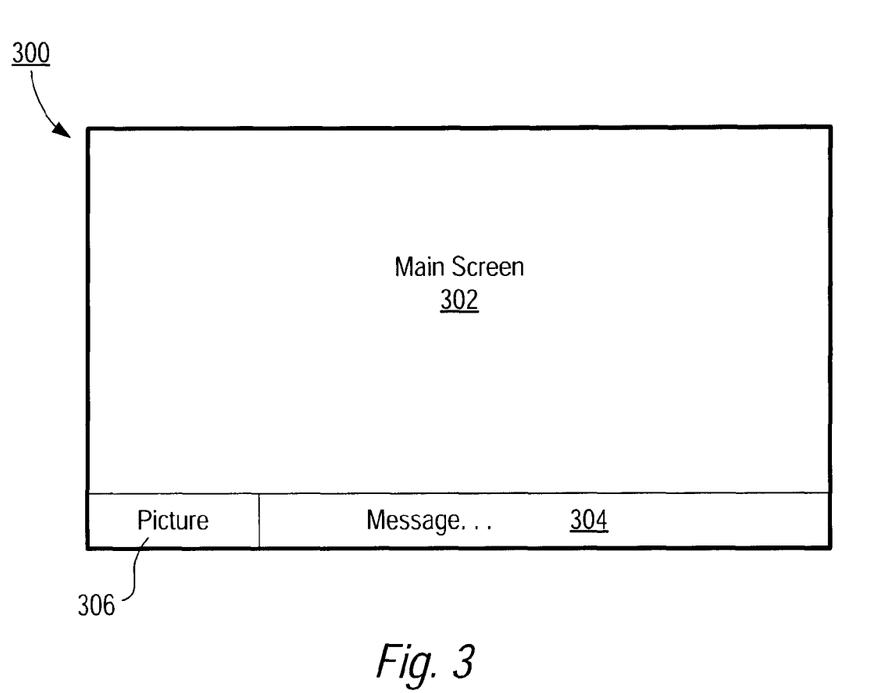
FIG. 3 shows an example of a screen display of a display device according to an embodiment of the present invention.

Upon exiting the message setting interface 200, the messages are retrieved from the memory module 120 according to the settings selected by the user using the options described in the foregoing. An exemplary screen display 300 by the display device 118 is shown in FIG. 3. The screen display 300 has a main screen portion 302, message or advertisement portion 304, and an image portion 306. Typically, the main screen portion 302 is reserved for displaying the usual programs or shows for which the display device 118 is intended. However, it can also be used for displaying important or urgent messages. These are messages with high priority attribute. For messages with low priority attribute, the message contents are displayed in the message portion 304 of the screen display 300. If there is no image or picture accompanying the message, the image portion 306 can also be used for displaying the message content, thus providing more displaying space.

Similarly, if the message includes solely images, the message portion 304 can also be used for displaying the images. In other embodiments, the location of the image portion 306 can be located at another portion of the screen display 300, such as at a bottom right hand corner or at either top corners. The message portion 304 can also be located at a different location of the screen display 300.

Figure 4:
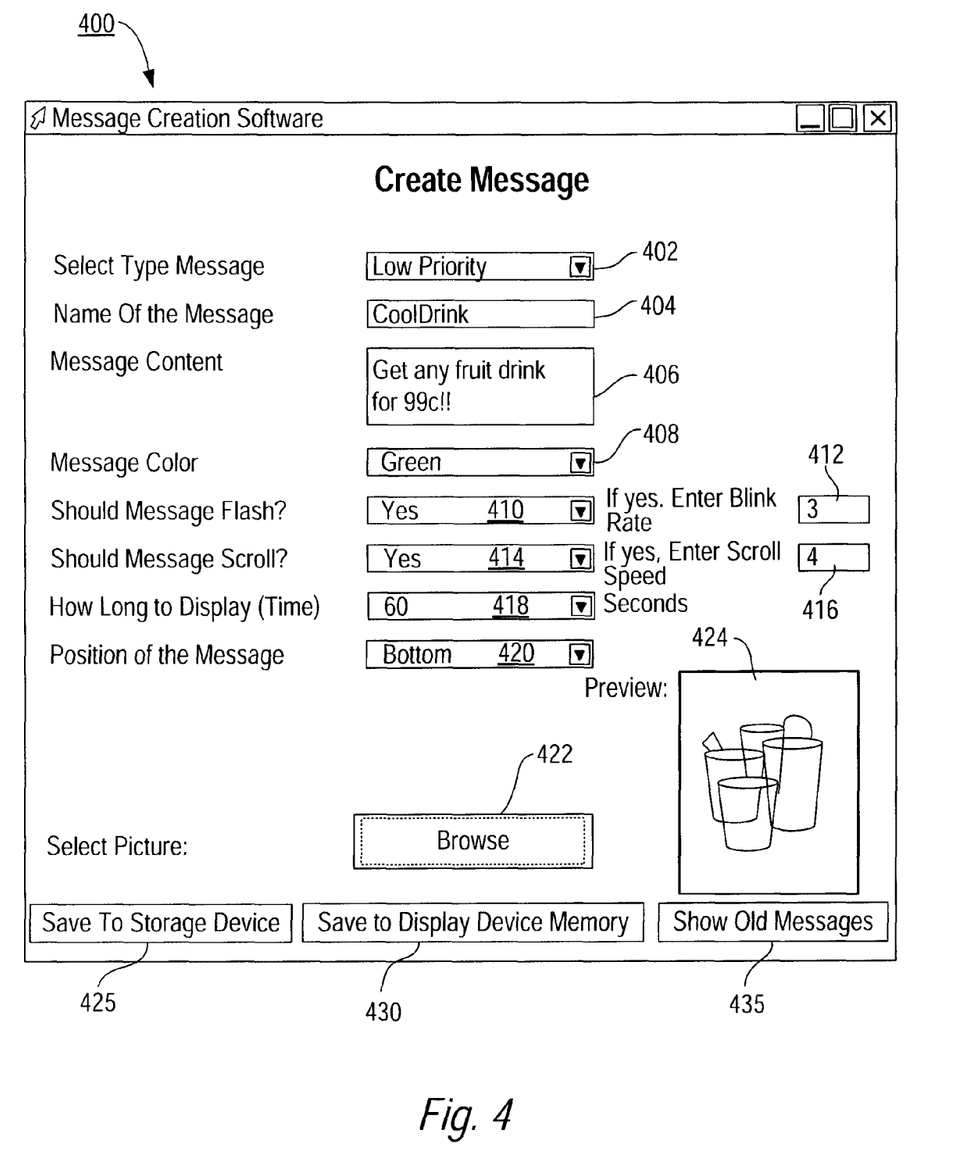
FIG. 4 shows an example of a low priority message creating interface according to an embodiment of the present invention.

The message content and image are provided by the user using the message composer 102. Upon invoking the message composer 102, a message creating interface 104 is provided on the screen of the computer system 101 for soliciting inputs from the user. An example of the message creating interface 104 is shown in FIG. 4. FIG. 4 shows a low priority message creating interface 400 according to an embodiment of the subject matter. The low priority message creating interface 400 includes an option for the user to select the priority of the message 402, an option for labeling or naming the message 404, and a message window 406 for the user to input the message content. The user is also provided with an option to select the color in which the message 408 is to be displayed, flashing option 410, rate of flashing 412, scrolling option 414, speed of scrolling 416, duration of message display 418, and the location on the screen 420 where the message is to be displayed.

The low priority message creating interface 400 also includes an image option 422 for the user to attach an image to the message content. Upon activating or clicking the image option 422, the user is presented with a window (not shown) for locating a desire image. Once the desired image is identified, a preview of the selected image is presented in a preview window 424.

Once the required information is provided, the user can choose to save the message content into the portable storage device 108 (as shown in FIG. 1) by clicking on option 425 or save the message content into the memory module 120 of the display device 118 (as shown in FIG. 1) by clicking on option 430. Upon clicking on option 425, the user is presented with an option to select one storage device from a list of available storage devices detectable by the computer system 101. Upon clicking on option 430, the computer system 101 automatically establishes a communication link with the display device 118 using either the wired connection 114 or wireless connection 112 via the wireless communication module 110 as shown in FIG. 1.

Upon clicking on either option 425 or 430, and prior to saving the message content according to the selected options, the message composer 102 generates a message file from the user input information using the file generator 106. The message file is in a format recognizable by the display device 118. Typically, the text messages can be in one of the standard formats such as ASCII, Unicode, UTF-8, and EBCDIC; while the images, sound bites, and video clips can be in one of the known formats such as BMP, MP3, JPEG, and PNG.

Figure 5:
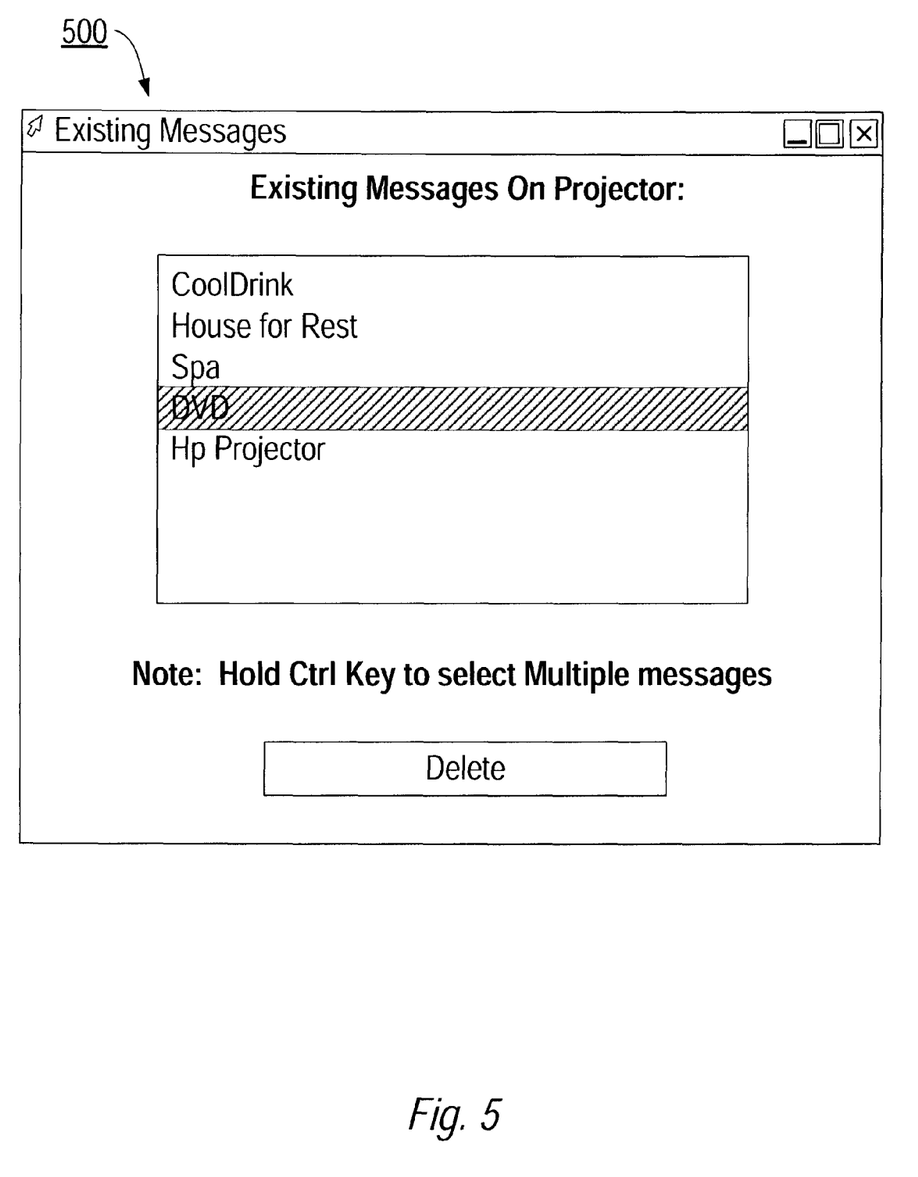
FIG. 5 shows an example of a window for managing existing messages stored in a display device according to an embodiment of the present invention.

The low priority message creating interface 400 also provides an option 435. Upon clicking on this option 435, an existing message window 500 as seen in FIG. 5 is presented to the user. The existing message window 500 shows a list of existing messages stored in the memory module 120 of the display device 118. This option 435 can be invoked if there is a communication link established between the computer system 101 and the display device 118. This option 435 allows the user to manage the existing messages stored in the memory module 120 of the display device 118. Accordingly, a number of managing options can be provided although only a delete option 502 is shown in the existing message window 500 in FIG. 5.

Figure 6:
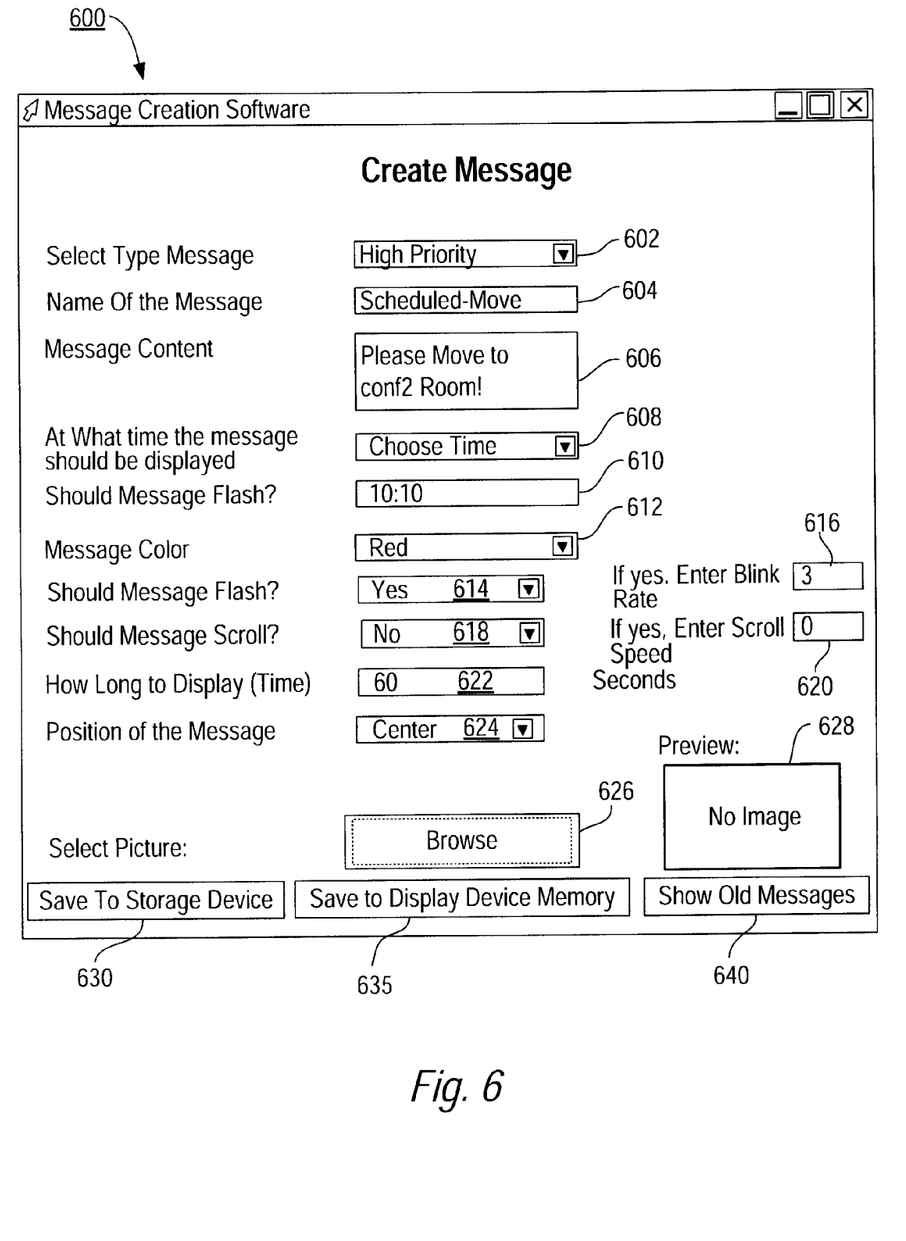
FIG. 6 shows an example of a high priority message creating interface according to an embodiment of the present invention.

Another example of the message creating interface is shown in FIG. 6. FIG. 6 shows a high priority message creating interface 600 according to an embodiment of the subject matter. The high priority message creating interface 600 includes an option for the user to select the priority of the message 602, an option for labeling or naming the message 604, and a message window 606 for the user to input the message content. The user is also provided with an option to select if the message should be displayed according to a specific time 608, the actual time the message is to be displayed 610, the color of the display message 612, flashing option 614, rate of flashing 616, scrolling option 618, speed of scrolling 620, duration of message display 622, and the location on the screen 624 where the message is to be displayed. Like for the low priority message creating interface 400, the user can also attach an image to the message content by clicking an image option 626. Once a desired image is identified, the selected image is displayed in a preview window 628. The high priority message creating interface 600 also includes options 630, 635, and 640. These options are the same as the options 425, 430, and 435, respectively, of the low priority message creating interface 400 of FIG. 4, which are described in the foregoing.

The high priority message creating interface 600 provides additional message attributes compared to the low priority message creating interface 400. For example, in low priority message creating interface 400, the actual time the message to be displayed option is not provided; and the option for choosing the location on the screen 420 where the message is to be displayed is either at the top or bottom positions. Whereas, in the high priority message creating interface 600, the user can specify the time of message display and the location selection option 624 is provided with top, bottom or centre positions. The center position in this case corresponds to the main screen portion 302 of the screen display 300 as shown in FIG. 3.

When the message files are created and are transferred to the display device 118, each message file is time stamped for establishing a queue as it is stored in the memory module 120. Alternatively, each message file can be assigned a sequential number as it is stored in the memory module 120 of the display device 118. The messages are therefore displayed sequentially according to the queuing position and message attributes of the messages.

In an embodiment, the message files stored in the memory module 120 of the display device 118 can be segregated into a low priority collection and a high priority collection. That is, the low and high priority messages can be stored in different locations in the memory module 120 or tagged as such at the time of storing. Thus, when the option 435 or 640 is selected, the existing message window 500 can show a list of existing messages in a high priority message portion and another in a low priority message portion (not shown in the drawings).

The message files are retrieved for rendering by the message management module 122 on the screen of the display device in the order the message files are stored. If the low priority option 204 and high priority option 206 (as seen in FIG. 2) are selected as "enable", the low priority message being displayed can be interrupted by a high priority message when the scheduled time for the displaying the high priority message arrives. Once the duration of the high priority message display expires, the low priority message display is resumed. If two high priority messages are scheduled to be displayed at the same time, the one that is assigned an earlier time stamp or a priori queue number is displayed first. Alternatively, both high priority messages can be displayed simultaneously thereby each occupying half of the display screen of the display device 118 or toggling between the two high priority messages for the duration of the specified display time. If the low priority option 204 is set to "disable", no message with low priority attribute is displayed. Similarly, if high priority option 206 is set to "disable", the messages with high priority attribute are not displayed, even if the low priority option 204 is set to "enable".

The system 100 illustrates a physical separation between the computer system 101 and the display device 118. As such, there is provided communication means (e.g. using portable storage device 108, wired connection 114, or wireless connection 112 via the wireless communication module 110) between the two entities for transferring the message files. In an embodiment, if the computer system 101 is a mobile phone, the communication with the display device 118 can be performed using the telephone network or an IP based telephone network to which the mobile phone is connected. In this embodiment, the message creating interface 104 can be simplified versions of the message creating interfaces 400 and 600 suitable for displaying on the mobile phone screen. Once the message content and message attributes are obtained, a message file is generated and is sent to the display device 118 using the telephone network or an IP based telephone network of the mobile phone. In this case, the display device 118 is adapted and assigned a fixed number for connecting to the telephone network.

Figure 7:
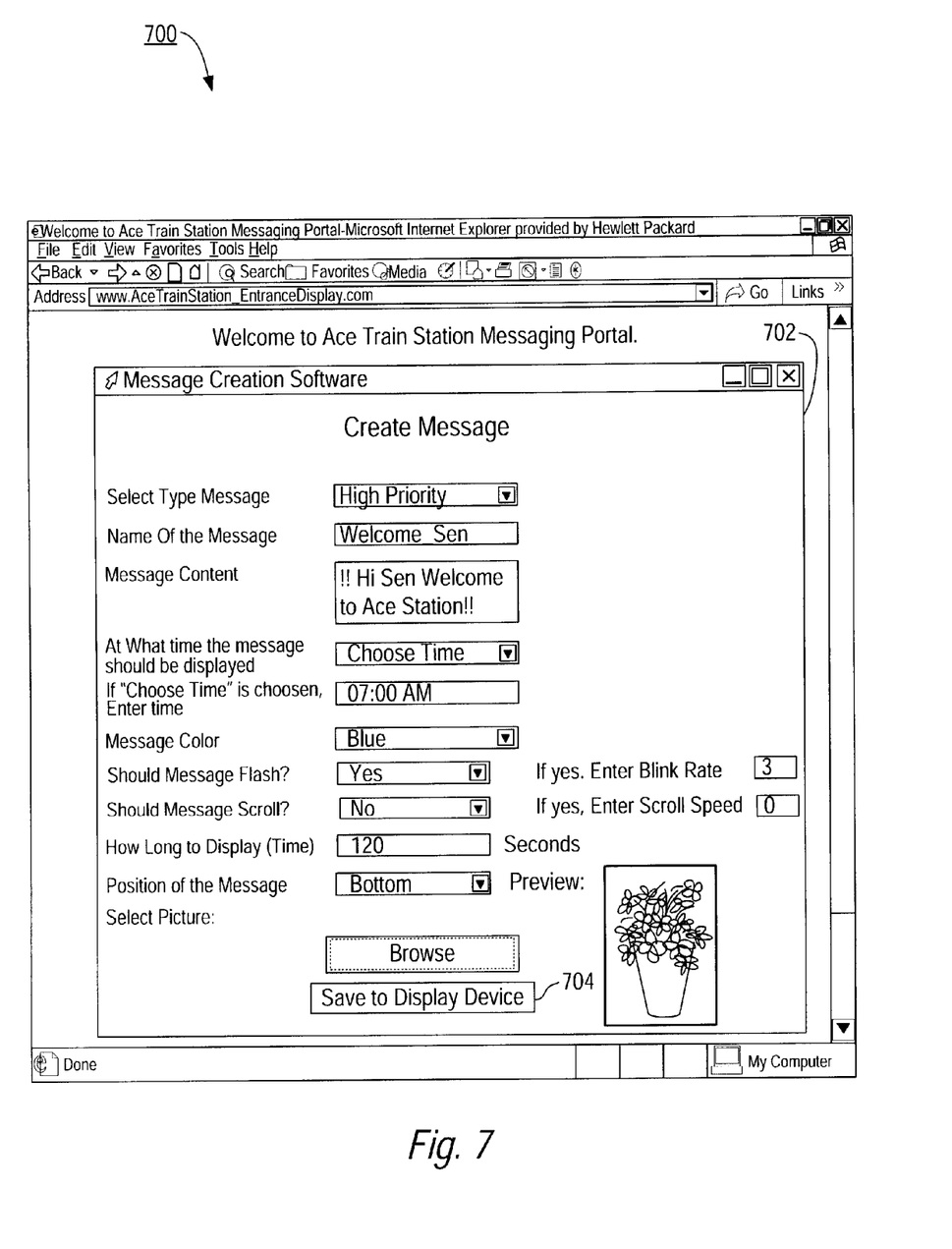
FIG. 7 shows an example of a web page interface for creating a message according to an embodiment of the present invention.

In another embodiment, communications between the computer system 101 and the display device 118 can also be established using the Internet system. In this embodiment, the display device 118 is network enabled and is assigned an IP address for connecting to the Internet system. To create a message file, a user merely needs to log on to a website address (e.g. www.AceTrainStation_EntranceDisplay.com) where the user is presented with a web page interface 700, as shown in FIG. 7. The web page interface 700 is generated by a message composer (like the message composer 102 of FIG. 1) which resides in a host server. The web page interface 700 shows an online message creating interface 702 for receiving the message content and attributes from the user. The online message creating interface 702 is similar to the message creating interfaces 400 and 600 as described in the foregoing with reference to FIGS. 4 and 6, respectively. The only difference is that the online message creating interface 702 only has an option 704 to save the message file to the display device. Upon the user clicking on the option 704, a message file is generated from the information provided in the online message creating interface 702 and the created message file is transferred over the Internet system to the display device having the IP address.

In an alternate embodiment, the computer system 101 may be integrated with the display device 118. Therefore, the generated message files can be directly stored in the memory module 120 using internal electronic interconnections and thereby alleviate the need for the wired connection 114 or wireless connection 112. In this alternate embodiment, the generated message files can still be stored on or copied to the portable storage device 108 via the input-output port 116 of the integrated system. The integrated system can be provided with an external keyboard providing message content. The external keyboard can interface with the integrated system via the input-output port 116 using a wired connection such as serial, parallel, or USB connectors. Alternatively, the external keyboard can interface with the integrated system using a wireless connection such as WiFi, Bluetooth, infra-red, ultra-wide band (UWB), and the like wireless communication protocols.

Figure 8:
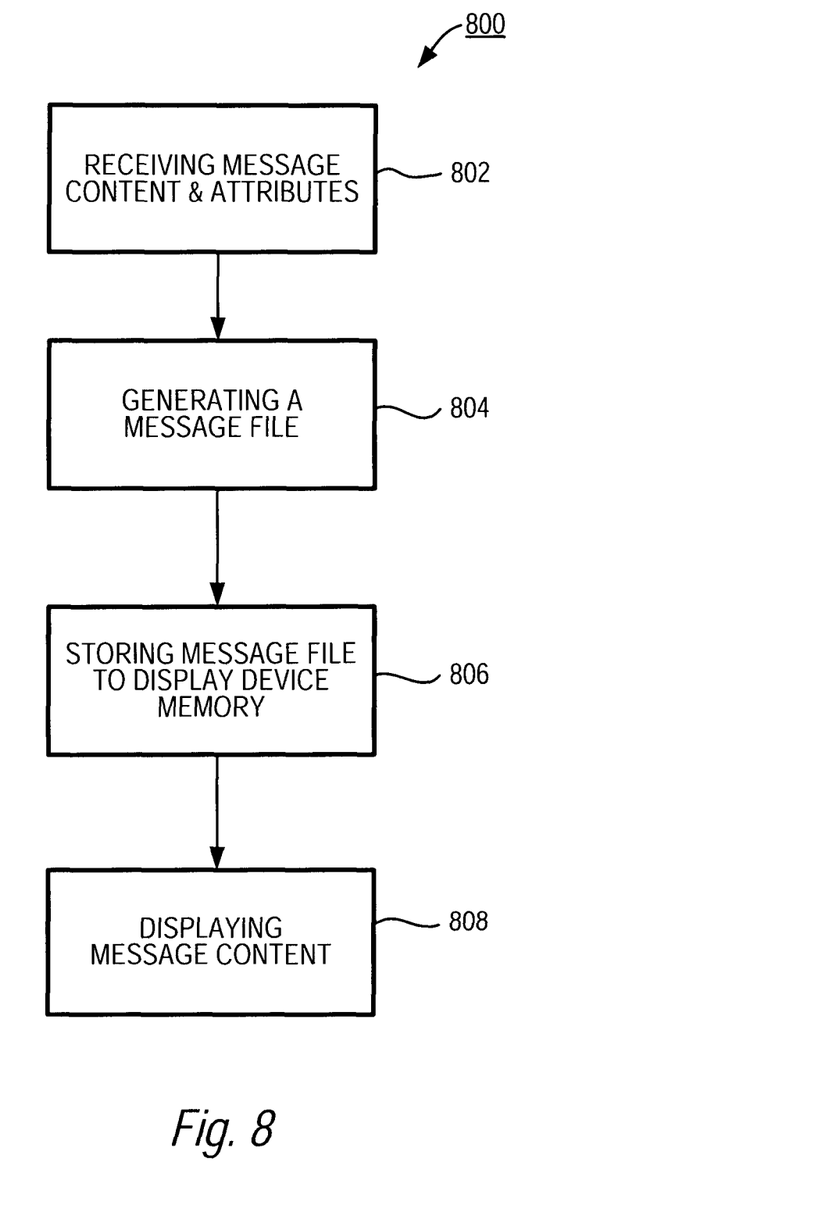
FIG. 8 shows a method of creating and displaying a message on a display device according to an embodiment of the present invention.

In an embodiment, a method 800 of creating and displaying a message using the system 100 is shown in FIG. 8. Step 802 of the method 800 involves receiving message content and attributes. Typically, the message content and attributes are obtained from a user by providing the user with an interface such as the interfaces shown in FIGS. 4 and 6. The message content can include texts, images, sound bites, video clips, or combinations thereof. The message attributes includes information such as the priority of the message (i.e. either low or high priority), the color in which the text message is to be displayed, the location of the message to be displayed on the screen, and information relating to flashing and scrolling of the displayed message. Other attributes such as fonts and font sizes and styles can also be included as message attributes.

Subsequently, in step 804, a message file containing the message content and attributes is generated using a file generator like the file generator 106 as described in the foregoing with reference to FIG. 1. The message file is in a format recognizable by a conventional display device such the display device 118 of FIG. 1 as described in the foregoing. The generated message file includes a content portion for containing the message content and a header portion for containing the message attributes.

The generated message file can then be transferred to and stored in the memory of a display device in step 806. Means for transferring the generated message file to the display device includes using a portable storage device 108, wired connection 114, or wireless connection 112 as described in the foregoing with reference to FIG. 1. In step 806, if the system 100 is an integrated system (i.e. the computer system 101 is integrated with the display device 118), no inter-entity message file transferred is needed. The generated message file can be directly stored in the memory module 120 of the integrated system.

In step 806, when storing the generated message file in the memory module 120, a time stamp or a sequential number is assigned to the message file for establishing a queue to facilitate message display sequence. In an embodiment, the message file is also tagged as either a low or high priority message as it is stored in the memory module 120. Alternatively, the message file can be stored in different locations in the memory module 120 according to the message priority attribute.

In step 808 of the method 800, message files stored in the memory module 120 is displayed upon the user activating the message management module 122 as described in the foregoing with reference to FIGS. 1 and 2. Typically, the message files with low priority attribute are displayed sequentially according to the time stamp or sequential number assigned thereto. The message management module 122 retrieves the message files from the memory module 120, extracts the message content therefrom and rendering the message content on the screen of the display device 118 according to the message attributes in the header portion of the message files in the order of the time stamp or sequential number assigned thereto. The way the message management module 122 displays the message files is governed by the option settings as seen in FIG. 2, which is described in the foregoing.

In the foregoing, embodiments of the invention are described with reference to FIGS. 1-8 for the purposes of illustration and description. It is not intended to be exhaustive or to limit the invention to the precise form disclosed. It is anticipated that individuals skilled in the art may make other modifications and equivalents thereto. Therefore, the foregoing description should not be taken as limiting the scope of the invention which is defined by the claims appended hereto.

The invention claimed is:

1. A system for creating a message and displaying the same comprising:
   a message composer operable on a computer system for composing and generating a message file having a content portion for containing a message content and a header portion for containing a message attribute, said message attribute including an instruction for a display device as to how to display said message content, wherein the message composer has a first interface for creating a high priority message and a second interface for creating a low priority message, wherein the first interface provides additional message attributes; and
   a display device, separate from said computer system, having a memory therein for storing the message file and a message management module for retrieving and rendering the message content on a screen in accordance with said message attribute, wherein the stored message file is assigned a sequential number for establishing a queue, wherein a display of a low priority message is interrupted by a high priority message when a scheduled time for the high priority message arrives.

2. The system of claim 1, wherein the message composer comprises
   a message creating interface for receiving the message content and message attribute; and
   a file generator for compiling the received message content and message attribute to provide the message file.

3. The system of claim 1, wherein the message content comprises at least one of a textual message, a sound bite, a video clip, and a picture.

4. The system of claim 1, wherein the message attribute comprises at least one of message color, location of display message on the screen of the display device, message priority, time of message display, duration of message display, picture format, message flashing rate, message scrolling rate, and textual message font attributes.

5. The system of claim 1, wherein the message management module further provides an option to enable or disable message display based on a priority of the message.

6. The system of claim 1, wherein the display device is at least one of an electronic projector, an LCD display system, and a television.

7. The system of claim 1, wherein the computer system is one of a personal computer, a mobile phone, a personal digital assistant, and a host server.

8. The system of claim 1, further comprising electronic transferring means for transferring the message file to the memory of the display device.

9. The system of claim 8, wherein the electronic transferring means is at least one of a storage device, wired connection means, and wireless connection means.

10. The system of claim 9, wherein the storage device is at least one of a solid state memory device, a hard disk, a floppy diskette, and an optical storage device.

11. The system of claim 9, wherein the wired connection is at least one of a USB connection, a serial connection, a parallel connection, a FireWire connection, and a network communication.

12. The system of claim 9, wherein the wireless connection is at least one of a WiFi connection, a Bluetooth connection, ultra-wide band connection, and an infra-red connection.

13. A method of displaying a message comprising:
   with a display device mounted in a public place for displaying information, receiving a message file comprising message content and a message attribute;
   storing the message file in a memory in the display device, wherein low priority messages are stored in a different location in memory from high priority messages; and
   displaying the message content on a portion of said display device, while other content is being displayed on a remainder of the display device, wherein a display of a low priority message is interrupted by a high priority message when a scheduled time for the high priority message arrives.

14. The method of claim 13, wherein the message content comprises at least one of textual message, a sound bite, a video clip, and a picture; the message attribute comprises at least one of message color, location of display message on the display device, message priority, time of message display, duration of message display, picture format, message flashing rate, message scrolling rate, and text message font attributes.

15. The method of claim 14, wherein displaying the message content comprises:
    rendering the message content of a message file having a first priority attribute; and
    then, replacing the rendering of the message content of the message file having the first message priority attribute with the rendering of the message content of a message file having a second message priority attribute.

16. The method of claim 13, further comprising providing a message setting interface at the display device for determining whether to display the message based on a priority of the message.

17. The method of claim 16, wherein displaying the message content comprises
    retrieving message files in the order of a queue; and
    sequentially rendering the message content of each message files with the display device.

18. The method of claim 17, wherein receiving the message file comprises using one of a wired connection, and a wireless connection.

19. The method of claim 13, wherein the display device comprises an external data port and receiving said message file comprises transferring said message file from a memory device communicatively coupled to said external data port to said memory of said display device.

20. A method of displaying an advertising messages comprising:
    providing a message composer operable on a computer system for composing and generating a message file having a content portion for containing a message content and a header portion for containing a message attribute, said message attribute including an instruction for a display device as to how to display said message content, wherein the message composer provides:
        a first interface for creating a high priority message;
        a second interface for creating a low priority message, wherein the first interface provides additional message attributes that are not provided in the second interface; and
        an option to enable or disable message display based on a priority of the message;
    with a display device mounted in a public place for displaying information, transferring a message file comprising advertising content into a memory incorporated into said mounted display device; and
    with the display device, displaying the advertising content on a portion of said display device, while other content is being displayed on a remainder of the display device, wherein a display of a low priority message is interrupted by a high priority message when a scheduled time for the high priority message arrives.

* * * * *